United States Patent
Chen (10) Patent No.: US 6,402,255 B1
(45) Date of Patent: Jun. 11, 2002

(54) BICYCLE WHEEL RIM CAPABLE OF MOUNTING SELECTIVELY WITH A CIRCULAR DISC AND A SET OF SPOKES

(75) Inventor: Chao-Ying Chen, Tainan Hsien (TW)

(73) Assignee: Alex Machine Industrial Co., Ltd. (TW)

( * ) Notice: Subject to any disclaimer, the term of this patent is extended or adjusted under 35 U.S.C. 154(b) by 0 days.

(21) Appl. No.: 09/713,567

(22) Filed: Nov. 16, 2000

(51) Int. Cl.⁷ .............................................. B60B 21/00
(52) U.S. Cl. .............................. 301/95.101; 301/95.104
(58) Field of Search ...................... 301/95.101, 95.104, 301/95.105, 95.106, 63.101, 63.106, 64.101, 64.102, 64.704, 64.701, 64.702, 37.101, 37.29

(56) References Cited

U.S. PATENT DOCUMENTS

| | | | |
|---|---|---|---|
| 3,602,550 A | * 8/1971 | Patane et al. | 301/37.104 |
| 4,645,267 A | * 2/1987 | Weld | 301/64.301 |
| 4,660,893 A | * 4/1987 | Huntzinger | 301/37.41 |
| 4,729,604 A | * 3/1988 | Dietz | 301/37.104 |
| 4,969,693 A | * 11/1990 | Molson | 301/37.11 |
| 4,978,174 A | * 12/1990 | Nosler | 301/37.11 |
| 5,064,250 A | * 11/1991 | Yashiro et al. | 301/64.101 |
| 5,551,763 A | * 9/1996 | Alsman | 301/64.704 |
| 6,089,672 A | * 7/2000 | Chen | 301/95.104 |
| 6,145,937 A | * 11/2000 | Chen | 301/95.104 |

* cited by examiner

Primary Examiner—S. Joseph Morano
Assistant Examiner—Long Bao Nguyen
(74) Attorney, Agent, or Firm—Webb Ziesenheim Logsdon Orkin & Hanson, P.C.

(57) ABSTRACT

A bicycle wheel rim has an integrally formed annular rim body with left and right tire retaining walls, and a base wall interconnecting the tire retaining walls. The base wall has a radial inner face facing a central axis of the rim body, a radial outer face, a left section connected to the left tire retaining wall, a right section connected to the right tire retaining wall, and a vaulted portion interconnecting the left and right sections. The vaulted portion is vaulted in a radial outward direction relative to the left and right sections so as to define an annular recess in the radial inner face and an annular protrusion on the radial outer face. The annular recess is adapted for retaining a peripheral portion of a circular disc therein. Optionally, the base wall is formed with a plurality of spoke mounting holes distributed in the left and right sections and adapted for retaining spoke fasteners therein.

5 Claims, 9 Drawing Sheets

BICYCLE WHEEL RIM CAPABLE OF MOUNTING SELECTIVELY WITH A CIRCULAR DISC AND A SET OF SPOKES

BACKGROUND OF THE INVENTION

1. Field of the Invention

The invention relates to a bicycle wheel rim, more particularly to a bicycle wheel rim capable of mounting selectively with a circular disc and a set of spokes.

2. Description of the Related Art

Figure 1:
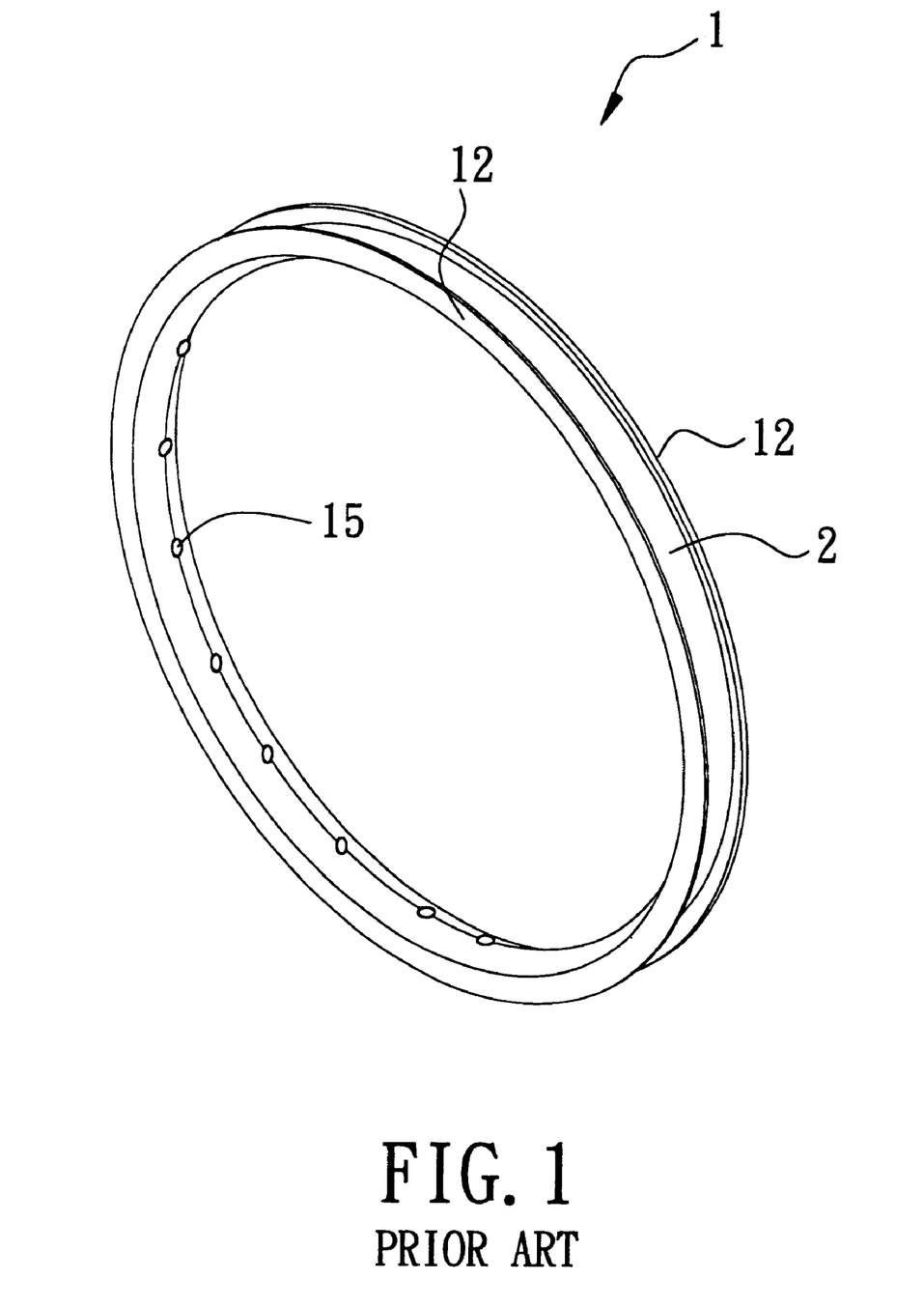
FIG. 1 is a perspective view of a conventional bicycle wheel rim.
Figure 2:
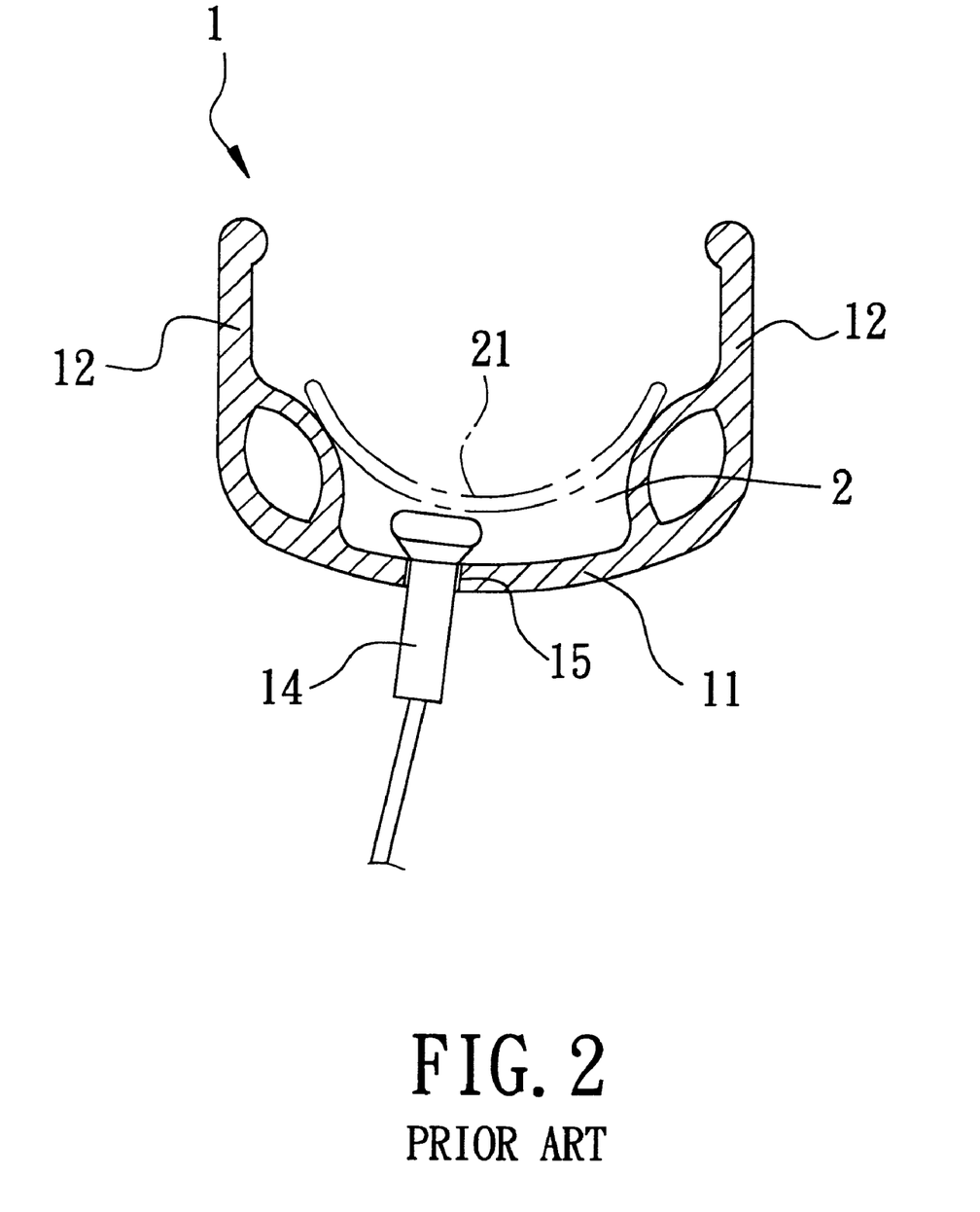
FIG. 2 is a fragmentary cross-sectional view of the conventional bicycle wheel rim when installed with an inner tire body before inflation of the inner tire body.

As shown in FIGS. 1 and 2, a conventional bicycle wheel rim 1 includes spaced-apart left and right annular tire retaining walls 12 and an annular spoke mounting wall 11 interconnecting the tire retaining walls 12. The spoke mounting wall 11 is formed with a plurality of angularly displaced spoke mounting holes 15 which are arranged along length of the spoke mounting wall 11 for retaining spoke fasteners 14 therein. The tire retaining walls 12 and the spoke mounting wall 11 cooperatively confine a tire retaining space 2 for retaining a bicycle tire 20 therein.

Figure 3:
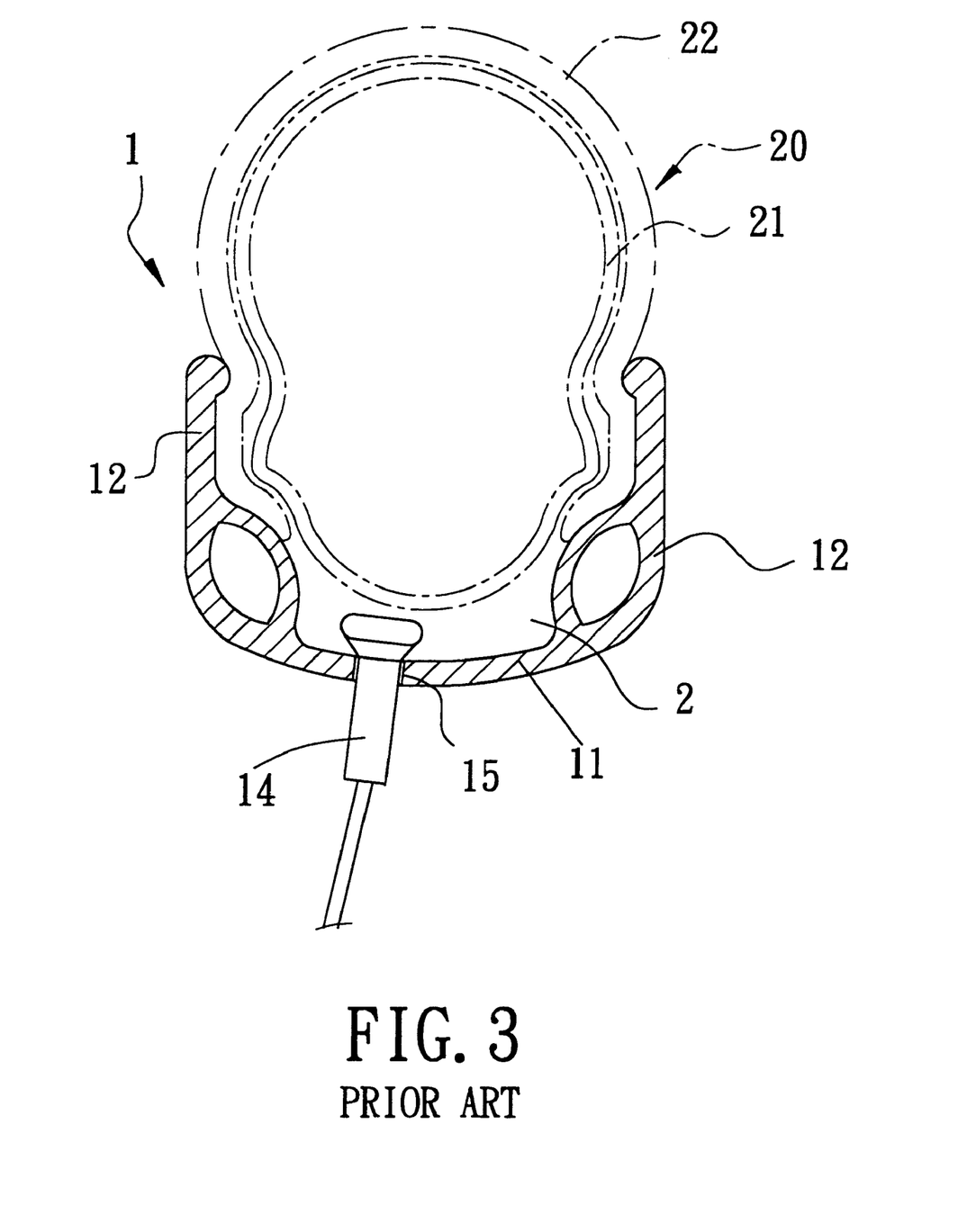
FIG. 3 is a fragmentary cross-sectional view of the conventional bicycle wheel rim after inflation of the inner tire body and after an outer tire body is installed thereon.

The bicycle tire 20 typically includes an inflatable inner tire body 21 and an outer tire body 22 enclosing the inner tire body 21, as shown in FIGS. 2 and 3. During the installation of the bicycle tire 20, the inner tire body 21 is first sleeved on the wheel rim 1 before inflation. The inner tire body 21 is usually disposed deeply in the tire retaining space 2 and close to the spoke mounting wall 11, and cannot be easily gripped when the outer tire body 22 is to be subsequently installed on the wheel rim 1.

Recently, it has been suggested in the art that the spokes be replaced with a circular disc made of aluminum-magnesium alloy. However, the circular disc can only be mounted on a rim body which is specially designed and which is provided with means for mounting the circular disc. It is desirable to provide a bicycle wheel rim which can be mounted with the aforesaid circular disc and which can be alternatively mounted with a set of spokes.

SUMMARY OF THE INVENTION

Therefore, the main object of the present invention is to provide a bicycle wheel rim capable of mounting selectively with a circular disc and a set of spokes.

Accordingly, the bicycle wheel rim of the present invention includes an integrally formed annular rim body with a central axis. The rim body has annular left and right tire retaining walls, and an annular base wall interconnecting the tire retaining walls. The tire retaining walls are spaced apart from each other. Each of the tire retaining walls has a radial inner edge proximate to the central axis of the rim body, a radial outer edge distal to the central axis of the rim body, and an intermediate portion between the radial inner and radial outer edges. The annular base wall has a radial inner face facing the central axis, a radial outer face opposite to the radial inner face, a left section which has a left terminating edge connected to the radial inner edge of the left tire retaining wall and a right terminating edge, a right section which has a right terminating edge connected to the radial inner edge of the right tire retaining wall and a left terminating edge, and a vaulted portion interconnecting the right terminating edge of the left section and the left terminating edge of the right section. The vaulted portion is vaulted in a radial outward direction relative to the left and right sections so as to define an annular recess in the radial inner face and an annular protrusion on the radial outer face. The annular recess is adapted for retaining a peripheral portion of a circular disc therein. Optionally, the base wall is formed with a plurality of spoke mounting holes which are distributed in the left and right sections and which are adapted for retaining spoke fasteners therein.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 4:
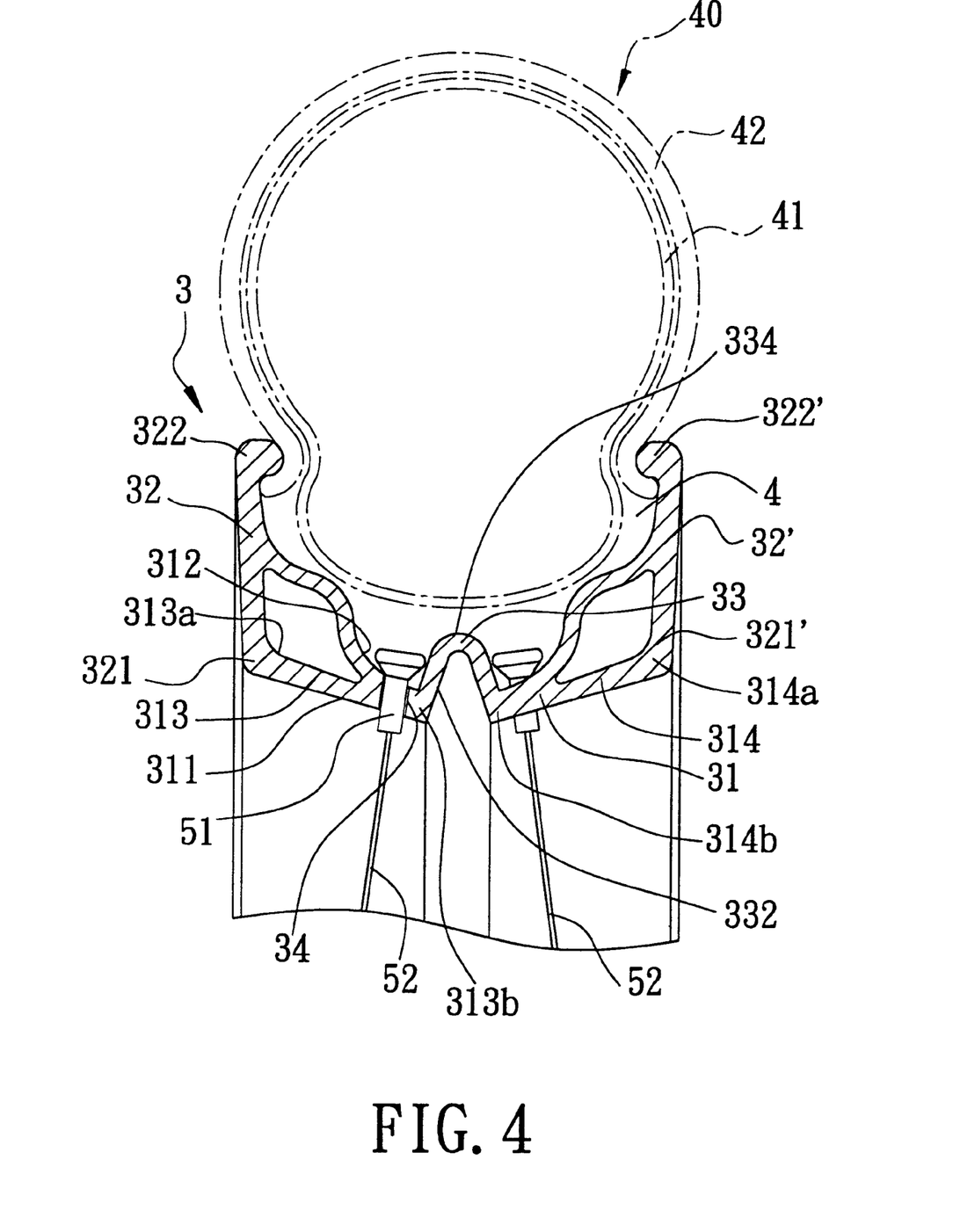
FIG. 4 is a fragmentary cross-sectional view of a first preferred embodiment of a bicycle wheel rim of the present invention.

Referring to FIG. 4, the first preferred embodiment of the bicycle wheel rim 3 of the present invention is shown to include an integrally formed annular rim body having annular left and right tire retaining walls 32, 32', and an annular base wall 31 interconnecting the left and right tire retaining walls 32, 32'. The left and right tire retaining walls 32, 32' and the base wall 31 cooperatively confine a tire retaining space 4 adapted for retaining a bicycle tire 40 therein.

The left and right tire retaining walls 32 are spaced apart from each other. Each of the tire retaining walls 32, 32' has a radial inner edge 321, 321' proximate to a central axis of the rim body, a radial outer edge 322, 322' distal to the central axis of the rim body, and an intermediate portion between the radial inner and radial outer edges 321, 321', 322, 322'. The radial outer edges 322, 322' of tire retaining walls 32, 32' are adapted for cooperatively retaining the bicycle tire 40.

The base wall 31 has a radial inner face 311 facing the central axis of the rim body, a radial outer face 312 opposite to the radial inner face 311, a left section 313, a right section 314, and a vaulted portion 33 between the left and right sections 313, 314. The left section 313 has a left terminating edge 313a connected to the radial inner edge 321 of the left tire retaining wall 32, and a right terminating edge 313b. The right section 314 has a right terminating edge 314a connected to the radial inner edge 321' of the right tire retaining wall 32', and a left terminating edge 314b. The vaulted portion 33 interconnects the right terminating edge 313b of the left section 313 and the left terminating edge 314b of the right section 314. The vaulted portion 33 is vaulted in a radial outward direction relative to the left and right sections 313, 314 so as to define an annular recess 332 in the radial inner face 311 of the base wall 31, and an annular protrusion 334 on the radial outer face 312 of the base wall 31. A plurality of spoke mounting holes 34 are formed in the base wall 31 after the rim body is formed, such as by extruding a metal strip. As shown, the spoke mounting holes 34 are distributed in the left and right sections 313, 314 on opposite sides of the vaulted portion 33 and are adapted for retaining spoke fasteners 51 therein for mounting a set of spokes 52.

When an inner tire body 41 of the bicycle tire 40 is mounted in the tire retaining space 4 before inflation of the former, the inner tire body 41 is raised by the annular protrusion 334 and can be easily gripped to facilitate installation of an outer tire body 42 thereon.

Figure 5:
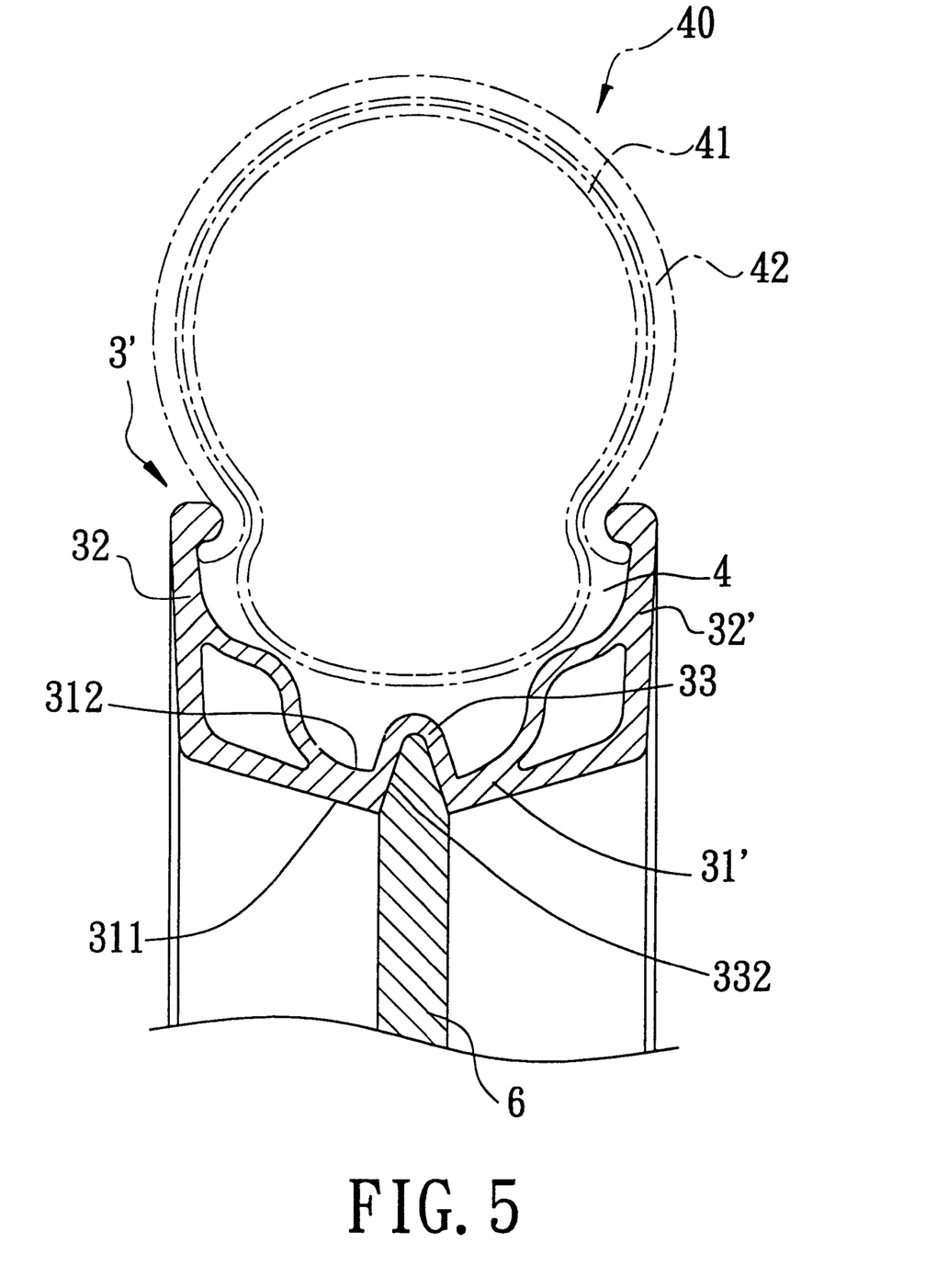
FIG. 5 is a fragmentary cross-sectional view of a bicycle wheel incorporating a circular disc and a second preferred embodiment of a bicycle wheel rim of the present invention.
Figure 6:
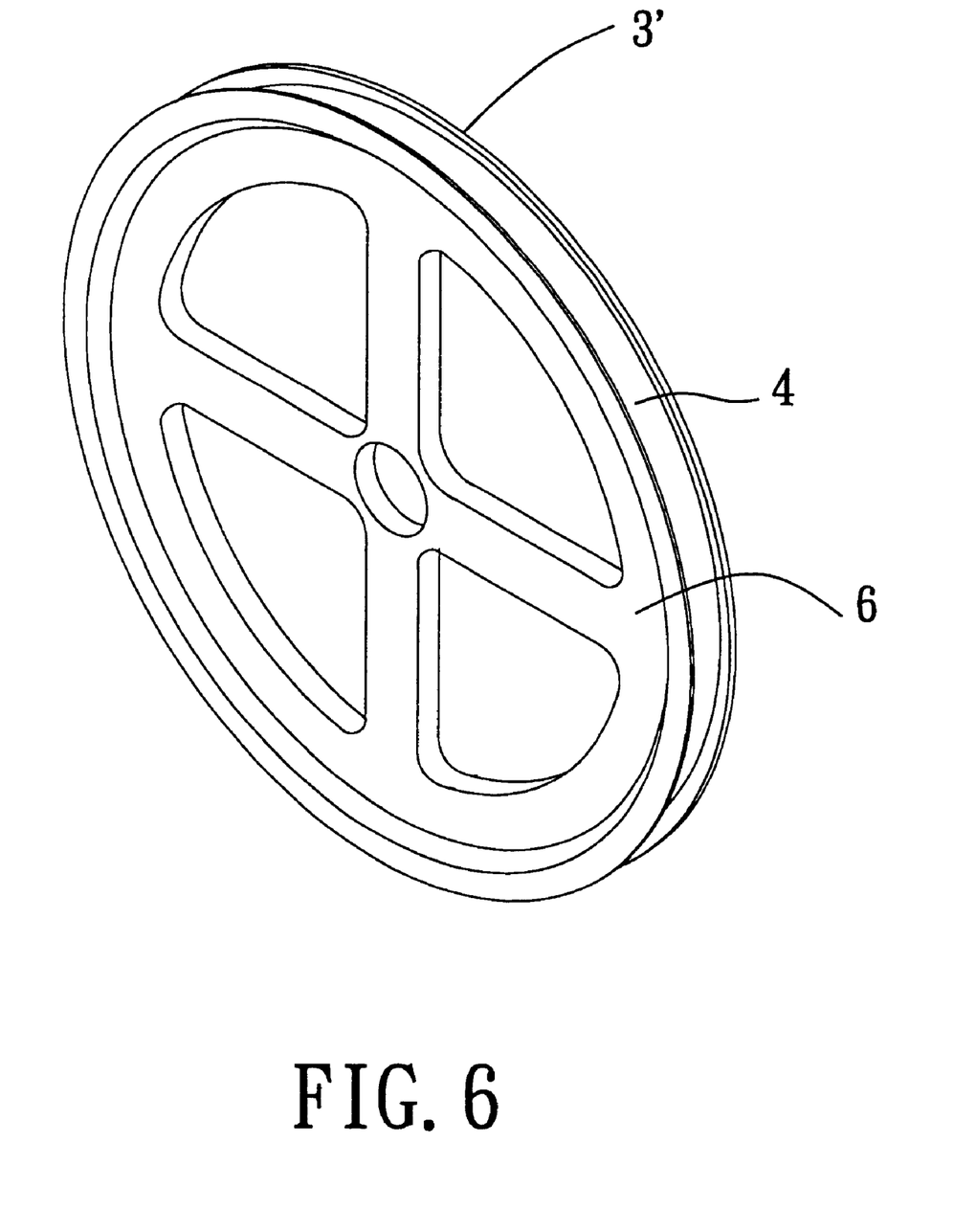
FIG. 6 is a perspective view of the bicycle wheel of FIG. 5.

Referring to FIGS. 5 and 6, the second preferred embodiment of the bicycle wheel rim 3' of this invention has a structure similar to that of the bicycle wheel rim 3 of the previous embodiment, except that the base wall 31' is not formed with the spoke mounting holes. The bicycle wheel rim 3' can be mounted with a circular disc 6 instead of the spokes. The circular disc 6 is formed integrally from a metal alloy, such as an aluminum-magnesium alloy. The circular disc 6 is surrounded by the wheel rim 3', and has a peripheral portion extending into and engaging the annular recess 332 that is defined by the vaulted portion 33.

Figure 7:
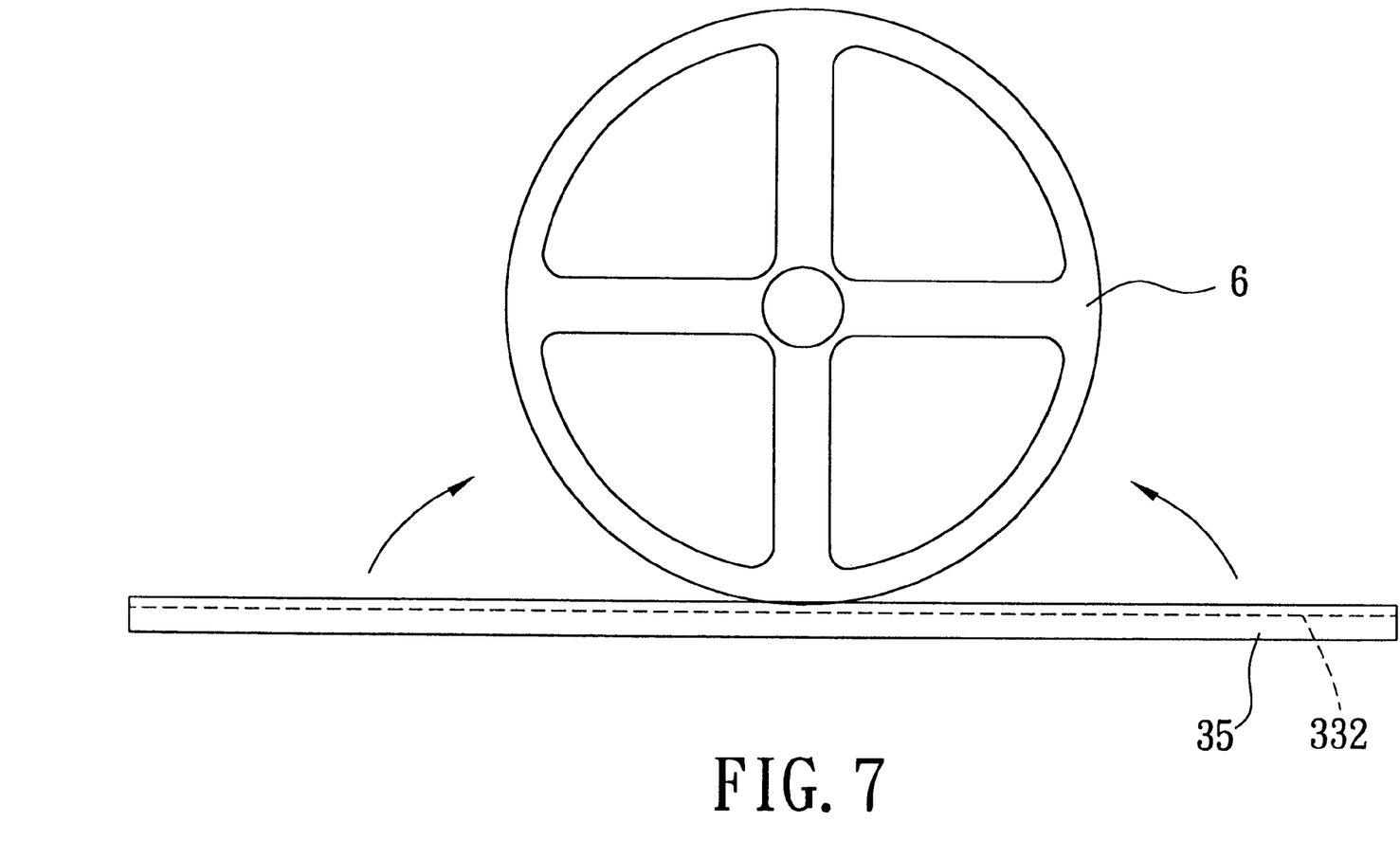
FIG. 7 is a schematic view illustrating the manufacture of the bicycle wheel of FIG. 5.

Referring to FIG. 7, in the manufacture of the wheel rim 3', a metal strip 35 is extruded and is then wound around the peripheral portion of the circular disc 6 so as to enable the peripheral portion of the circular disc 6 to extend into and engage the annular recess 332. The peripheral portion of the circular disc 6 can then be secured to the wheel rim 3' by welding or by means of screw fasteners.

Figure 8:
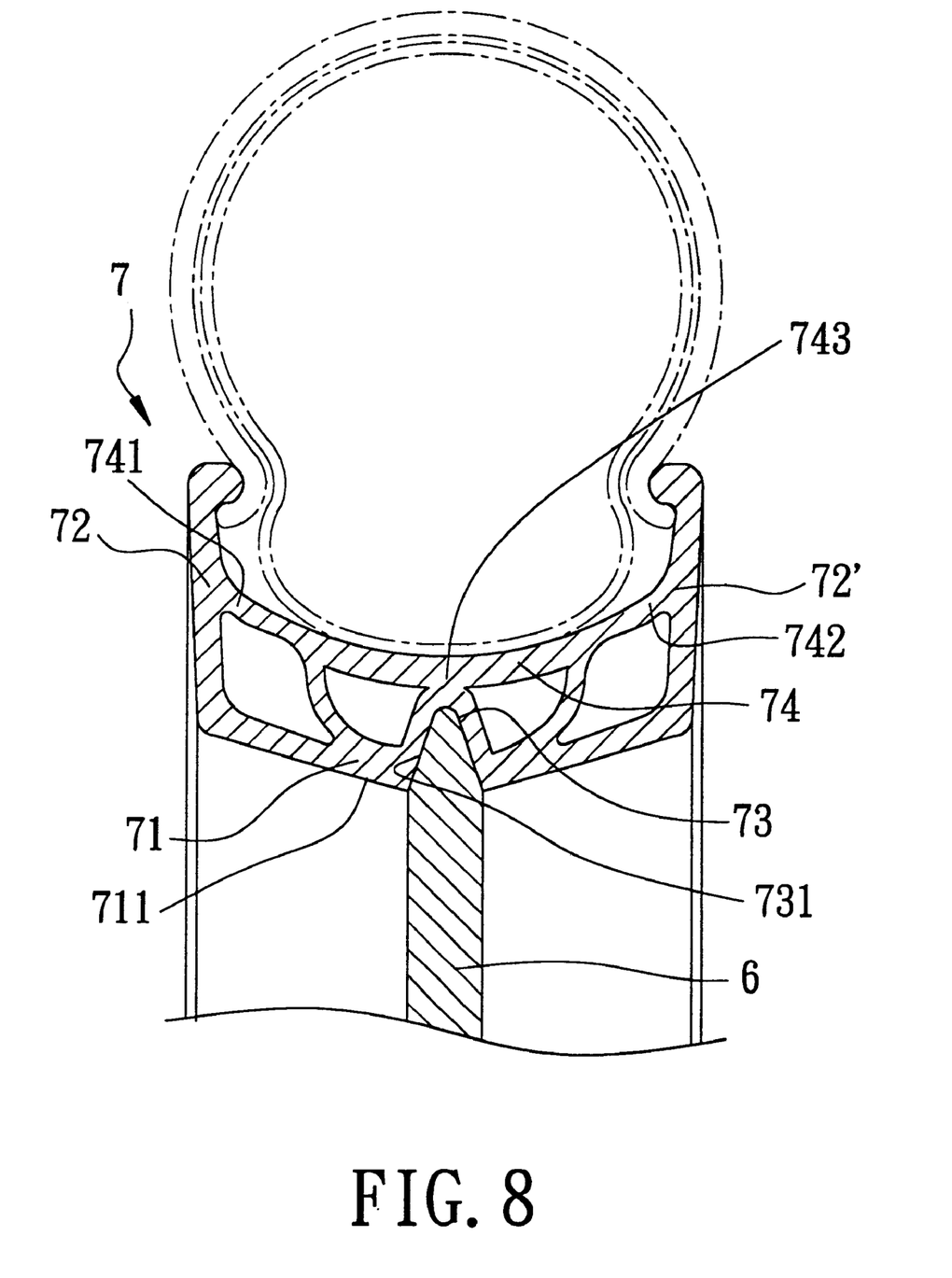
FIG. 8 is a fragmentary cross-sectional view illustrating a bicycle wheel incorporating a circular disc and a third preferred embodiment of the bicycle wheel rim of the present invention.

Referring to FIG. 8, the third preferred embodiment of the bicycle wheel rim 7 of the present invention has a structure similar to the bicycle wheel rim 3' of the previous embodiment, except that the rim body further has an annular reinforcing wall 74 which is disposed around the base wall 71 to reinforce the bicycle wheel rim 7. The reinforcing wall 74 has left and right end portions 741,. 742 connected respectively to the intermediate portions of the left and right tire retaining walls 72, 72'. The reinforcing wall 74 further has an intermediate connecting portion 743 between the left and right end portions 741, 742 and connected integrally to the vaulted portion 73 of the base wall 71. As with the previous embodiment, the bicycle wheel rim 7 of the present embodiment can be mounted with the circular disc 6 at the annular recess 731 formed in the radial inner face 711 of the base wall 71 and defined by the vaulted portion 73.

Figure 9:
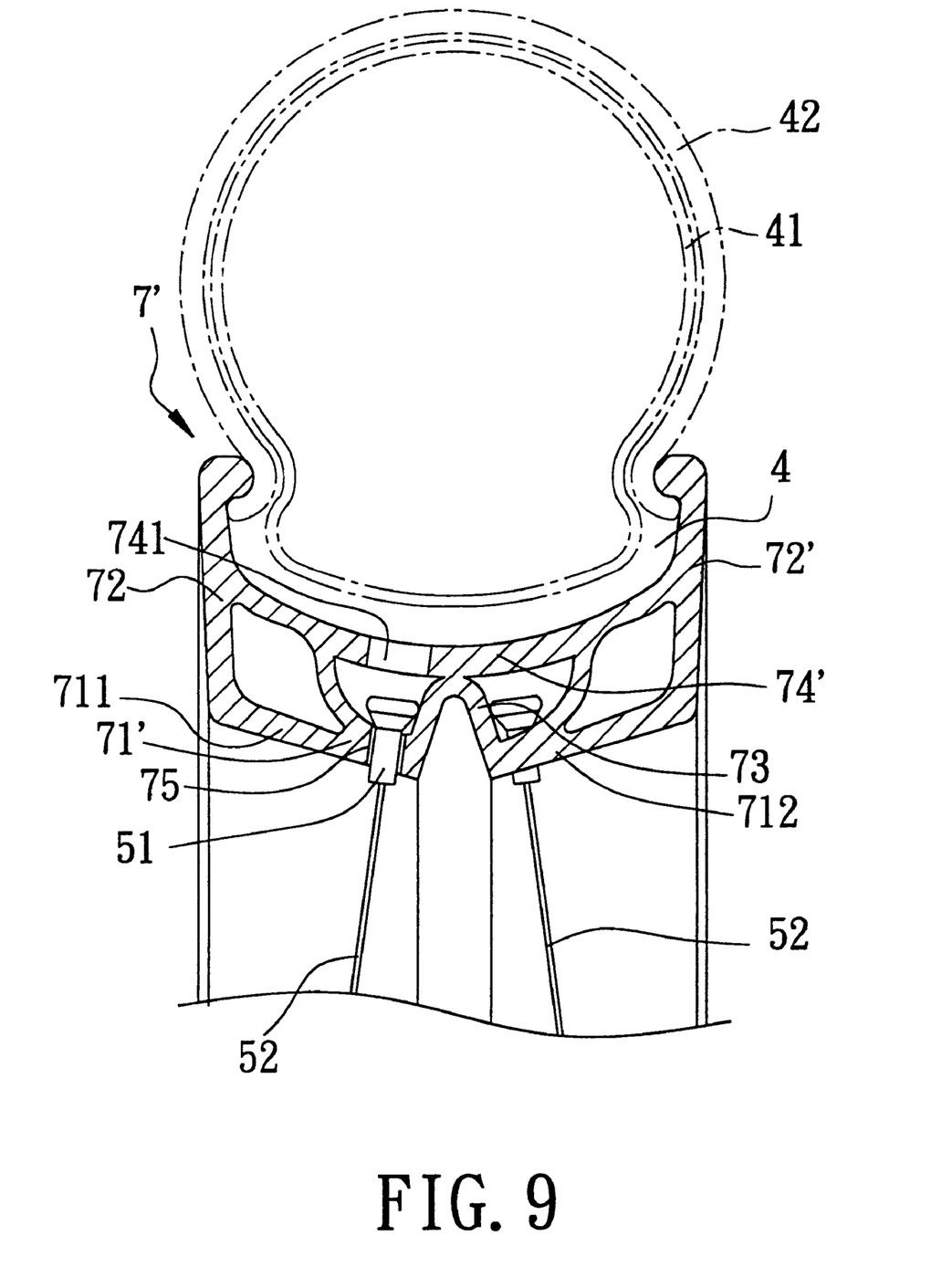
FIG. 9 is a fragmentary cross-sectional view illustrating a fourth preferred embodiment of the bicycle wheel rim of the present invention.

Referring to FIG. 9, the fourth preferred embodiment of the bicycle wheel rim 7' of this invention has a structure similar to that of the bicycle wheel rim 7 of the previous embodiment, except that the base wall 71' is formed with a plurality of spoke mounting holes 75, and that the reinforcing wall 74 is formed with a plurality of spoke passage holes 741 aligned respectively with the spoke mounting holes 75. The spoke mounting holes 75 are distributed in the left and right sections 711, 712 of the base wall 71 on two opposite sides of the vaulted portion 73. The spoke passage holes 741 are adapted to permit passage of spoke fasteners 51 through the reinforcing wall 74. The spoke mounting holes 75 are adapted to retain the spoke fasteners 51 therein for mounting the spokes 52 on the bicycle wheel rim 7'.

It has thus been shown that the bicycle wheel rim 3,3', 7, 7' of the present invention can be mounted with a circular disc 6, and can be optionally formed with spoke mounting holes 34, 75 for mounting a set of spokes 52. Moreover, in the embodiments shown in FIGS. 4 and 5, the annular protrusion 334 on the radial outer face of the annular base wall 31, 31' facilitates installation of a bicycle tire 4 on the wheel rim 3, 3'.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A bicycle wheel rim comprising an integrally formed annular rim body with a central axis, said rim body including:

annular left and right tire retaining walls which are spaced apart from each other, each of said tire retaining walls having a radial inner edge proximate to the central axis of said rim body, a radial outer edge distal to the central axis of said rim body, and an intermediate portion between said radial inner and radial outer edges; and an annular base wall having a radial inner face facing said central axis, a radial outer face opposite to said radial inner face, a left section which has a left terminating edge connected to said radial inner edge of said left tire retaining wall and a right terminating edge, a right section which has a right terminating edge connected to said radial inner edge of said right tire retaining wall and a left terminating edge, and a vaulted portion interconnecting said right terminating edge of said left section and said left terminating edge of said right section, said vaulted portion being vaulted in a radial outward direction relative to said left and right sections so as to define an annular recess in said radial inner face and an annular protrusion on said radial outer face, said annular recess being adapted for retaining a peripheral portion of a circular disc therein, said base wall being formed with a plurality of spoke mounting holes which are distributed in said left and right sections and which are adapted for retaining spoke fasteners therein.

2. The bicycle wheel rim as claimed in claim 1, wherein said rim body further includes an annular reinforcing wall disposed around said base wall, said reinforcing wall having left and right end portions connected respectively to said intermediate portions of said left and right tire retaining walls, and an intermediate connecting portion between said left and right end portions, said connecting portion of said reinforcing wall being connected integrally to said vaulted portion of said connecting wall, said reinforcing wall being formed with a plurality of spoke passage holes aligned respectively with said spoke mounting holes in said base wall and adapted to permit passage of spoke fasteners therethrough.

3. A bicycle wheel comprising:

an integrally formed annular rim body with a central axis, said rim body including:

annular left and right tire retaining walls which are spaced apart from each other, each of said tire retaining walls having a radial inner edge proximate to the central axis of said rim body, a radial outer edge distal to the central axis of said rim body, and an intermediate portion between said radial inner and radial outer edges; and an annular base wall having a radial inner face facing said central axis, and a radial outer face opposite to said radial inner face, said base wall including a left section which has a left terminating edge connected to said radial inner edge of said left tire retaining wall and a right terminating edge, a right section which has a right terminating edge connected to said radial inner edge of said right tire retaining wall and a left terminating edge, and a vaulted portion interconnecting said right terminating edge of said left section and said left terminating edge of said right section, said vaulted portion being vaulted in a radial outward direction relative to said left and right sections so as to define an annular recess in said radial inner face and an annular protrusion on said radial outer face; and a circular disc having a peripheral portion which extends into and which engages said annular recess in said annular base wall of said rim body.

4. The bicycle wheel as claimed in claim 3, wherein said rim body further includes an annular reinforcing wall disposed around said base wall, said reinforcing wall having left and right end portions connected respectively to said intermediate portions of said left and right tire retaining walls, and an intermediate connecting portion between said left and right end portions, said connecting portion of said reinforcing wall being connected integrally to said vaulted portion of said base wall.

5. The bicycle wheel as claimed in claim 3, wherein said circular disc is formed from a metal alloy.

* * * * *